May 6, 1941.  A. A. STUART, JR  2,240,680
EARTH INDUCTOR COMPASS
Filed Dec. 29, 1938
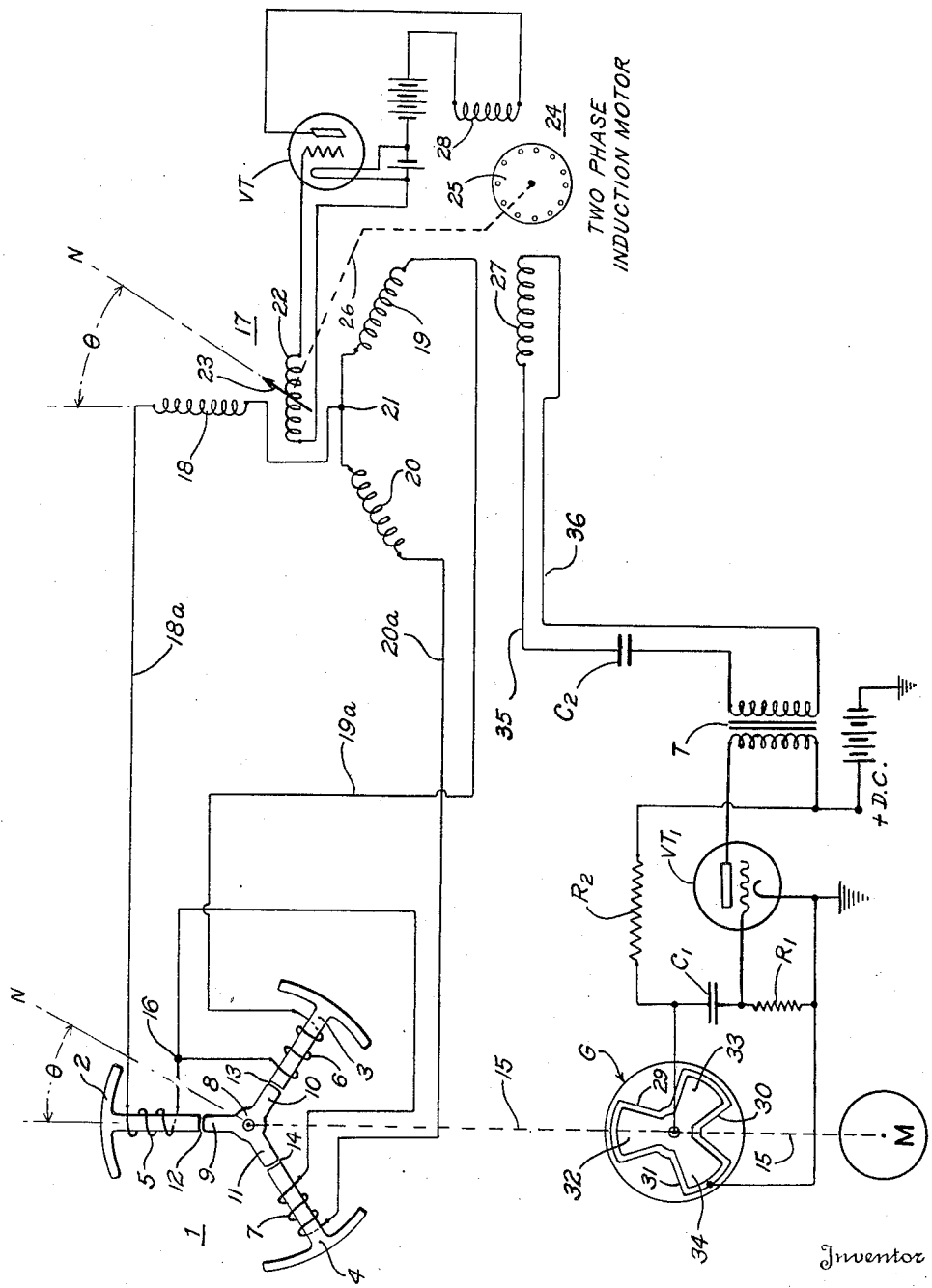
Inventor
A. A. Stuart, Jr.
By Stephen Cerstvik
Attorney Patented May 6, 1941

2,240,680

UNITED STATES PATENT OFFICE 2,240,680

EARTH INDUCTOR COMPASS

Alfred A. Stuart, Jr., Brooklyn, N. Y., assignor to Bendix Aviation Corporation, South Bend, Ind., a corporation of Delaware Application December 29, 1938, Serial No. 248,344

13 Claims. (Cl. 33—204)

The present invention relates to magnetic compasses and more particularly to earth inductor compasses for remotely indicating the direction of the earth's magnetic field.

One of the objects of the invention is to provide a novel earth inductor compass system which indicates the direction of the earth's magnetic field throughout three hundred sixty degrees (360°).

Another object of the invention is to provide an earth inductor compass system comprising a novel remote compass indicator in combination with a novel earth inductor.

A further object is to provide a novel earth inductor compass system for reproducing at a remote point the direction of the earth's magnetic field, in which system the angular displacement in azimuth of an earth induction device is utilized to control a remote servomotor through suitable mechanism so as to cause said servomotor to actuate or drive an indicator into corresponding positional agreement with the induction device, to thereby indicate the direction of the earth's magnetic field.

A still further object of the invention is to provide a novel combination comprising a remote indicator, a two-phase electric motor for actuating said indicator, a source of alternating current for energizing one phase winding of said motor, an electrical circuit arrangement including the other phase winding of said motor, and direction responsive means comprising a magnetic induction device for producing in said circuit arrangement an alternating current out of phase with the current in the first phase of said motor, whereby the latter rotates to actuate the indicator when current is produced in said circuit arrangement upon relative angular movement of said direction responsive means.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for purposes of illustration and description only, and is not to be construed as defining the limits of the invention, reference being had for this purpose to the appended claims.

The invention consists substantially in the construction, location and relative arrangement of parts and circuits for obtaining the results desired in accordance with the foregoing objects, as will be more fully hereinafter set forth in the specification, as shown in the drawing by way of example, and as finally pointed out in the claims.

The single figure of the drawing is a schematic circuit diagram of one exemplary arrangement embodying the present invention.

Referring now to the single figure of the drawing, the earth inductor device is shown at 1 and comprises a highly permeable magnetic member constituted, in the present embodiment, by three radially extending pole pieces, 2, 3 and 4 angularly spaced equally one hundred twenty degrees (120°) apart. The inductor device 1 is relatively stationary and may be fixed to the craft (not shown) on which the direction of the earth's magnetic field is to be indicated, with the pole pieces 2, 3 and 4 arranged in a substantially horizontal plane. Wound on the pole pieces 2, 3 and 4 are coils or windings 5, 6 and 7, respectively.

Means are now provided for generating alternating current E. M. F.'s in the coils 5, 6 and 7 respectively, by the earth's magnetic field by periodically, in the present instance mechanically, varying the earth's magnetic flux in the pole pieces 2, 3 and 4 and, in the form shown, said means comprise a rotor 8 also of highly permeable magnetic material such as permalloy, for example, provided with radial projections or pole pieces 9, 10 and 11 which form air gaps 12, 13 and 14 with the cooperating inner ends of the pole pieces 2, 3 and 4, respectively. The rotor member 8 is drivably connected to a suitable driving device such, for example, as an electric motor M for rotation by the latter, as indicated by the dotted line 15 representing a drive shaft.

Upon rotation of the rotor 8, the reluctance of the magnetic paths formed by the gaps 12, 13 and 14 is increased and decreased periodically and thus the flux produced in the pole pieces 2, 3 and 4 is periodically varied, thereby inducing alternating E. M. F.'s in the coils 5, 6 and 7, respectively. The amplitudes of these E. M. F.'s are respectively proportional to the cosine of the angle between the magnetic center line of each coil or winding and the direction of the earth's magnetic field. The angle between the magnetic center line of coil 5 on pole piece 2 and magnetic North is shown at $\phi$.

The coils or windings 5, 6 and 7 are connected in three-phase relation at the junction 16.

In order to indicate the direction of the earth's magnetic field, i. e., to indicate magnetic North, as determined by the E. M. F.'s generated in the coils or windings 5, 6, and 7 of the earth inductor device 1, a novel indicating device is provided which is shown at 17 and which comprises, as shown, an inductive device of the so-called "Selsyn" or "Autosyn" type, including a stator having three windings 18, 19 and 20 connected together in three-phase relation at 21, and to the windings 5, 6 and 7, respectively, by leads or wires 18a, 19a and 20a respectively, and a rotor having a single-phase winding 22 and an indicating pointer 23.

The single-phase winding 22 of the rotor is arranged in inductive relation with the three-phase-connected windings 18, 19 and 20.

Thus, by virtue of the connections, 18a, 19a and 20a, the E. M. F.'s generated in the coils 5, 6 and 7 by the earth's magnetic field are reproduced in the windings 18, 19 and 20, respectively, which E. M. F.'s then induce a single-phase E. M. F. in the rotor winding 22 when the latter is not in agreement with the position of the inductor device 1, and hence of the coils or windings 5, 6 and 7, with respect to the direction of the earth's field, as when the inductor device has been moved angularly in azimuth due to a deviation of the craft on which the apparatus is mounted. When, however, the winding 22 is in agreement with the position of the inductor device 1 and its coils or windings 5, 6 and 7, then no E. M. F. is induced in the rotor winding 22, such position of said rotor winding being a null position of which there are two, one hundred eighty degrees (180°) apart.

What is meant by agreement between rotor winding 22 and the position of device 1 is that coil 22 is in alignment with or in non-inductive relation to the direction of the maximum resultant field produced by coils 18, 19 and 20.

Means are now provided for utilizing the single-phase E. M. F. induced in the rotor winding 22 by the stator windings 18, 19 and 20 when the position of said winding 22 is not in agreement with the position of the inductor device 1 and coils or windings 5, 6 and 7 with respect to the direction of the earth's magnetic field, to actuate said winding 22 and rotate it in the proper direction until it is in agreement with the position of the inductor device with respect to the direction of the earth's field. In the form illustrated, such actuating means comprising a two-phase induction motor 24 having a rotor 25 drivably connected to the rotor 22 of the indicating device 17 as indicated by dotted line 26 which represents a suitable reduction gearing by which the rotor 22 is rotated only a fraction of a revolution for one revolution of the rotor 25, and a pair of stator windings 27 and 28.

It is well known that if the windings of the two phases of a two-phase induction motor are energized by alternating currents having the same frequency but substantially ninety degrees (90°) out of phase, a torque is produced which causes the rotor to rotate, and the greater the phase displacement between zero (0) and ninety degrees (90°), the greater the torque. If, however, the winding of one phase of such a motor is not energized, no torque will be produced and the rotor will remain stationary.

In accordance with the present invention and based upon the above-stated phenomenon of the two-phase induction motor, means are now provided for energizing the stator windings 27 and 28 of the two-phase induction motor 24 by alternating currents having substantially the same frequency but being out of phase, preferably and substantially ninety degrees (90°), whereby to produce a torque to cause the rotor 25 to rotate and such a direction as to rotate the rotor winding 22 of the indicator 17 into a null position upon angular displacement of the inductor device 1 with respect to the direction of the earth's field. For this purpose, as illustrated, the winding of one phase of the motor 24, namely, winding 28, is connected to be energized by the single-phase alternating current produced by the single phase E. M. F. induced in the rotor 22 of the indicator 17 by the E. M. F.'s in the stator windings 18, 19 and 20. In the present embodiment, this single-phase alternating current is first amplified before being supplied to the winding 28, and therefore, a thermionic vacuum tube amplifier VT is provided, the input of which is connected to the winding 22 and the output to the induction motor winding 28.

The other alternating current for energizing the winding of the other phase of the two-phase induction motor 24, namely winding 27, is generated locally and, in the present instance, simultaneously with generation of the E. M. F.'s in coils 5, 6 and 7 of the earth inductor device 1. To this end, there is provided a generator G which comprises, as illustrated, a variable electrostatic condenser having a stationary plate provided with radially extending portions 29, 30 and 31, and a rotatable plate provided with radially extending portions 32, 33 and 34. The rotatable plate is drivably connected to the electric motor M, as indicated by the dotted line 15, and, therefore, is rotated at the same speed as the rotor 8 of the earth inductor device 1.

The variable condenser is connected to the input of a thermionic vacuum tube VT$_1$ through a fixed condenser C$_1$ and across a resistor R$_1$, and the output of the vacuum tube VT$_1$ is connected to the single-phase winding 27 of the two-phase induction motor 24 through a transformer T and a phasing condenser C$_2$.

A direct current charging potential is impressed on the variable condenser through a resistor R$_2$ and the potential across said resistor R$_2$ is periodically increased and decreased by rotation of the rotatable plate and its radial portions 29, 30 and 31 of the variable condenser G by the electric motor M. This varying potential is amplified by the vacuum tube VT$_1$, thereby producing a single-phase alternating current in the output of the transformer T, which current is supplied to the winding 27 of the two-phase induction motor 24 by wires or leads 35 and 36 through the phasing condenser C$_2$. The frequency of said current depends on the speed of rotation of the rotatable plate of the condenser G and, therefore, is the same as the frequency of the single-phase alternating current induced in winding 22 by the E. M. F.'s generated by the earth's field and supplied to the other winding 28 of the induction motor 24 because the same electric motor M drives the rotor 8 as well as the condenser G.

The phase of the single-phase alternating current produced in the output of transformer T is likewise substantially the same as that of the single-phase alternating current induced in the winding 22 of the indicator 17 and supplied to the other winding 28 of the two-phase induction motor 24, but in order to operate said induction motor to actuate the winding 22, the current in winding 27 must be out of phase with the current in winding 28 and, therefore, the phasing condenser C$_2$ is provided, the capacity of which is such as to shift the phase of the current transformer T substantially ninety degrees (90°) with respect to the current in winding 28, thus causing the currents in windings 27 and 28 to be substantially ninety degrees (90°) out of phase.

The operation of the complete system described above is as follows:

When the rotor 22 of the indicator 17 is in a position corresponding to the initial or "N" position of the earth inductor device 1 with respect to the direction of the earth's magnetic field, i. e., when winding 22 is in one of the null positions which are determined by the azimuthal position of the device 1, no voltage is induced in said winding by the three E. M. F.'s in stator coils 18, 19 and 20 generated by the earth's field, because the three E. M. F.'s are balanced in their inductive action on winding 22, and, therefore, no alternating current is supplied to the winding 28 of the induction motor 24.

When, however, the earth inductor device 1 is displaced angularly with respect to the direction of the earth's field, as when the craft on which the apparatus is mounted deviates in azimuth in one direction or another, so that the position of said device 1 is no longer in agreement with the corresponding position of the winding 22, the E. M. F.'s in the windings 18, 19 and 20 become unbalanced in their inductive action on winding 22 and induce an alternating E. M. F. in the winding to produce an amplified alternating current in winding 28 the amplitude and phase of which, with respect to the amplitude and phase of the single-phase alternating current in winding 27, are such as to produce a torque on the rotor 25 of the two-phase induction motor 24, which is proportional to the amount and direction of angular displacement of the earth inductor device 1 with respect to the direction of the earth's magnetic field, thereby causing said rotor 25 to rotate the rotor 22 of the indicator 17 in the proper direction and the proper amount to bring said rotor 22 into a null position corresponding to the new position of the device 1 with respect to the earth's field.

As soon as the rotor 22 reaches the null position, the E. M. F.'s in winding 18, 19 and 20 become balanced in their inductive action on winding 22 and no voltage is induced in the winding so that the rotor 25 of the induction motor 24 stops, this position then being indicated by indicating pointer 23 on a suitable scale (not shown) graduated in degrees of compass direction from zero (0) to three hundred sixty degrees (360°).

There is thus provided a novel earth inductor compass and a novel indicating device, whereby the compass direction can be indicated throughout three hundred sixty degrees (360°) without any ambiguity in the indication, and whereby the indication may be reproduced at a plurality of remote points, if desired, by merely providing a second indicator like indicator 17 and a second induction motor like motor 24, with the stator windings of the second indicator connected to the windings 5, 6 and 7 of the earth inductor device 1 and in parallel with the stator windings 18, 19 and 20 of the first indicator 17, and with one phase of the second two-phase motor connected to the rotor winding of the second indicator and the other phase of said second motor connected to the transformer T and in parallel with the winding 27 of the first motor 24.

While only one embodiment of the invention has been illustrated and described, various changes in form, construction and relative arrangement of parts and circuits, which will now appear to those skilled in the art, may be made without departing from the scope of the invention. Reference is, therefore, to be had to the appended claims for a definition of the limits of the invention.

What is claimed is:

1. An earth inductor compass comprising, in combination, an inductive device having a stator winding and a rotor winding in inductive relation with said stator winding, one of said windings being polyphase and the other winding being single phase, indicating means controlled by relative rotation of said windings, an electric driving motor for actuating the rotor winding of said inductive device, means comprising an earth induction device for deriving from the horizontal component of the earth's magnetic field an electromotive force varying in value and direction in accordance with the amount and direction that said earth induction device is displaced in azimuth relative to the direction of the earth's magnetic field, said induction device being electrically connected to the stator winding of said inductive device, whereby an electromotive force is induced in the rotor winding of said inductive device upon displacement of said induction device, a local source of electro-motive force, said local source being connected to energize said driving motor, and power amplifying means electrically connected to the rotor winding of said inductive device and responsive to the electromotive force derived from the earth's magnetic field by said induction device for controlling said driving motor to actuate the rotor winding of said inductive device into an angular position corresponding to the position that said earth induction device has been displaced, thereby controlling said indicating means to indicate the direction of the earth's magnetic field.

2. An earth inductor compass comprising, in combination, an inductive device having a rotor and a stator, indicating means controlled by the relative rotation of said rotor and stator, an electric driving motor for actuating the rotor of said inductive device, earth induction means for deriving from the horizontal component of the earth's magnetic field an electromotive force varying in value and direction in accordance with the amount and direction that said induction means are displaced in azimuth relative to the direction of the earth's magnetic field, said induction means being electrically connected to the stator of said inductive device, whereby said electromotive force is induced in said stator upon displacement of said induction device, and power amplifying means electrically connected to the rotor of said inductive device and responsive to the electromotive force derived from the earth's magnetic field by said earth induction means for controlling said driving motor to actuate the rotor of said inductive device into an angular position corresponding to the position that said earth induction means have been displaced, thereby controlling said indicating means to indicate the direction of the earth's magnetic field.

3. An earth inductor compass comprising, in combination, an inductive device having a stator winding and a rotor winding in inductive relation with said stator winding, one of said windings being polyphase and the other winding being single phase, indicating means controlled by the rotor of said inductive device, a two-phase alternating current driving motor having a winding in each phase thereof for actuating the rotor winding of said inductive device, means comprising an induction device for deriving an alternating electromotive force varying in value and direction in accordance with the amount and direction that said earth induction device is displaced from a predetermined position in azimuth relative to the earth's magnetic field, means connecting said earth induction device to energize one of the windings of said inductive device, means connecting the other winding of said inductive device to energize the winding of one phase of said driving motor, a local source of alternating electromotive force having the same frequency as the electromotive force derived from the earth's magnetic field, and means connecting said local source to the winding of the other phase of said driving motor to actuate the rotor winding of said inductive device into an angular position corresponding to the position that said earth induction device has been displaced, thereby controlling said indicating means to indicate the direction of the earth's magnetic field.

4. In combination, remote indicating means comprising an indicator and an inductive device having a stator winding and a rotor winding for controlling said indicator, one of said windings being a polyphase winding and the other being a single phase winding in inductive relation with said polyphase winding, a two-phase alternating current driving motor having a winding in each phase thereof connected to actuate the rotor winding of said inductive device to control said indicator, a local source of alternating current connected to energize the winding of one phase of said driving motor, an electrical circuit arrangement including the winding of the other phase of said driving motor and the rotor winding of said inductive device, and direction responsive means comprising a magnetic induction device electrically connected to the stator winding of said inductive device for producing in said circuit arrangement an alternating current out of phase with the current in the winding of the first phase of said driving motor, whereby the latter rotates to actuate the rotor winding of said inductive device for controlling the indicator when current is produced in said circuit arrangement upon relative angular displacement of said direction responsive means in azimuth.

5. In combination, remote indicating means comprising an indicator and an inductive device having a stator winding and a rotor winding for controlling said indicator, one of said windings being a polyphase winding and the other being a single phase winding in inductive relation with said polyphase winding, a two-phase alternating current driving motor having a winding in each phase thereof connected to actuate the rotor winding of said inductive device to control said remote indicating means, a source of alternating current connected to energize the winding of one phase of said driving motor, direction responsive means responsive to the earth's magnetic field comprising a magnetic induction device for generating another alternating current having the same frequency as the first alternating current but out of phase therewith, means connecting said induction device to one of the windings of said inductive device, and means connecting the other winding of said inductive device to energize the winding of the other phase of said driving motor, whereby the latter rotates to actuate the rotor winding of said inductive device for controlling said indicating means upon relative angular displacement of said direction responsive means in azimuth.

6. In combination, means comprising an inductive device having a stator winding and a rotor winding, one of said windings being a polyphase winding and the other being a single phase winding in inductive relation with said polyphase winding, a two-phase alternating current driving motor having a winding in each phase thereof for actuating the rotor winding of said inductive device, a source of alternating current connected to energize the winding of one phase of said driving motor, an electrical circuit arrangement including the winding of the other phase of said driving motor and one winding of said inductive device, and direction-responsive means comprising a magnetic induction device in circuit with the other winding of said inductive device for producing in said circuit arrangement an alternating current out of phase with the current in the winding of the first phase of said driving motor, whereby the latter rotates to actuate the rotor winding of said inductive device when current is produced in said circuit arrangement upon relative angular displacement of said direction responsive means in azimuth.

7. In combination, means comprising an inductive device having a stator winding and a rotor winding in inductive relation with said stator winding, one of said windings being polyphase and the other single phase, a two-phase alternating current driving motor connected to actuate the rotor winding of said inductive device, a source of alternating current connected to energize one phase winding of said driving motor, magnetic direction responsive means responsive to the earth's magnetic field comprising a magnetic induction device having a plurality of windings connected in polyphase relation for generating another alternating current having the same frequency as the first alternating current, means connecting the windings of said induction device to the polyphase winding of said inductive device, and means connecting the single phase winding of said inductive device to energize the other phase winding of said driving motor, whereby the latter rotates to actuate the rotor winding of said inductive device upon relative angular movement of said direction responsive means in azimuth.

8. In combination, controlling means comprising an inductive device having a stator winding and a rotor winding in inductive relation with said stator winding, one of said windings being polyphase and the other single phase, a two-phase alternating current driving motor connected to actuate the rotor winding of said inductive device, a source of alternating current connected to energize one phase of said driving motor, direction responsive means comprising a magnetic induction device for generating another alternating current having the same frequency as the first alternating current, means connecting said magnetic induction device to one of the windings of said inductive device, and means connecting the other winding of said inductive device to energize the other phase of said driving motor, whereby the latter rotates to actuate the rotor winding of said inductive device upon relative angular displacement of said direction responsive means in azimuth.

9. An earth inductor compass comprising, in combination, earth induction means including a highly permeable magnetic core element having a plurality of radial pole pieces with windings thereon connected in polyphase relation for generating a plurality of alternating electromotive forces from the horizontal component of the earth's magnetic field, the amplitudes of said electromotive forces being respectively proportional to the cosine of the angle between the magnetic center line of each winding and the direction of the horizontal component of the earth's magnetic field, means for locally generating a single phase alternating electromotive force having the same frequency as the electromotive forces generated from the earth's field, an inductive device comprising a rotor member and a stator member, one of said members having a plurality of windings thereon connected in polyphase relation and respectively energized by the plurality of electromotive forces generated from the earth's field in the first-named windings, and the other of said members of said inductive device having a single phase winding thereon in inductive relationship with the plurality of polyphase-connected windings on said first member of said inductive device, whereby upon angular displacement of said earth induction means an alternating electromotive force is induced in said single phase winding of said inductive device by the inductively associated plurality of polyphase-connected windings, and a polyphase alternating current driving motor having its rotor drivably connected to the rotor of the inductive device and having a winding of one phase thereof electrically connected to said local single phase alternating current generating means for energization thereby and having a winding of another phase thereof electrically connected to the single phase winding of said inductive device, the electromotive force supplied to one phase winding of said driving motor being out of phase with the electromotive force supplied to the other phase winding of said motor, whereby the rotor of said inductive device is actuated by said driving motor to an angular position corresponding to the position that said earth induction means have been displaced, to thereby indicate the direction of the earth's magnetic field.

10. Means for indicating the direction of the earth's magnetic field comprising, in combination, an indicator, an inductive device provided with a polyphase winding and a single phase winding in inductive relation with said polyphase winding, one of said windings being rotatably mounted and mechanically connected to said indicator, a source of alternating current, direction responsive means comprising a magnetic induction device having a polyphase winding connected to the polyphase winding of said inductive device for inducing in the single phase winding of said inductive device an electromotive force having a frequency equal to the frequency of said alternating current source upon angular displacement of said magnetic induction device from a predetermined position in azimuth relative to the direction of the earth's magnetic field, and a two-phase electric driving motor drivably connected to the rotatable winding of said inductive device and having one phase winding thereof connected to said alternating current source and the other phase winding thereof connected to the single phase winding of said inductive device, whereby said rotatable winding is rotated an angular amount corresponding to the amount of displacement of said magnetic induction device in azimuth.

11. In combination, controlling means comprising an inductive device having a stator winding and a rotor winding in inductive relation with each other, one of said windings being polyphase and the other being single phase, a two-phase alternating current driving motor connected to actuate the rotor winding of said inductive device and having a winding in each phase thereof, a source of alternating current connected to energize the winding of one phase of said driving motor, means comprising a magnetic induction device adapted to be traversed by a magnetic flux from a uni-directional magnetic field for generating another alternating current having the same frequency as the first alternating current, means connecting said magnetic induction device to one of the windings of said inductive device, and means connecting the other winding of said inductive device to energize the winding of the other phase of said driving motor, whereby the latter rotates to actuate the rotor winding of said inductive device upon relative angular movement between said induction device and said unidirectional field.

12. In combination, controlling means comprising an inductive device having a stator winding and a rotor winding in inductive relation with each other, one of said windings being polyphase and the other being single phase, a two-phase alternating current driving motor connected to actuate the rotor winding of said inductive device and having a winding in each phase, a source of periodically varying current connected to energize the winding of one phase of said driving motor, means comprising a magnetic induction device adapted to be traversed by a magnetic flux from a uni-directional magnetic field for generating another periodically varying current having the same frequency as the first periodically varying current, means connecting said induction device to one of the windings of said inductive device, and means connecting the other winding of said inductive device to energize the winding of the other phase of said driving motor, whereby the latter rotates to actuate the rotor winding of said inductive device upon relative angular movement between said induction device and said uni-directional magnetic field.

13. An earth inductor compass comprising, in combination, an electrical indicator having a rotor member and a stator member in inductive relation with each other, a polyphase alternating current driving motor drivably connected to the rotor member of said indicator for actuating the latter and having a winding in each phase thereof, means comprising an earth induction device for deriving from the horizontal component of the earth's magnetic field an alternating electromotive force varying in value and direction in accordance with the amount and direction that said earth induction device is angularly displaced in azimuth relative to the direction of the horizontal component of the earth's magnetic field, said induction device being electrically connected to one of the members of the indicator, a source of alternating current having the same frequency as the electromotive force derived from the earth's field by said induction device, power amplifying means connected to the other member of said indicator and controlled by the electromotive force derived from the earth's field by said induction device for supplying current to the winding of one phase of said driving motor, and electrical connections between said alternating current source and the winding of another phase of said driving motor for supplying current thereto out of phase with the current supplied to the winding in the first phase thereof, whereby said driving motor actuates the rotor of said indicator an angular amount corresponding to the angular displacement of the earth induction device, thereby indicating the direction of the earth's magnetic field.

ALFRED A. STUART, JR.